March 31, 1953  L. W. SEIFRIED  2,633,080
ADDRESS TYPE PRINTING DEVICE
Filed March 3, 1951
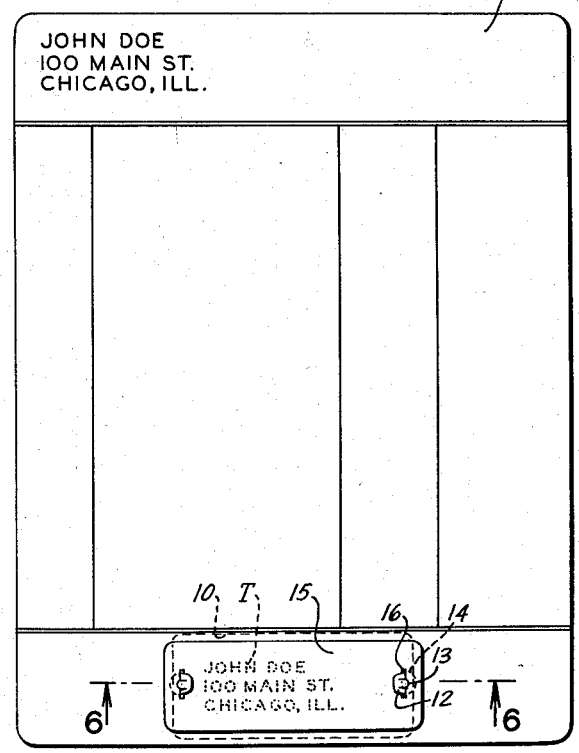
FIG. 1
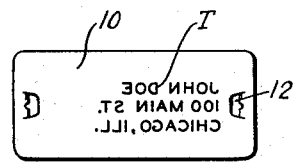
FIG. 3
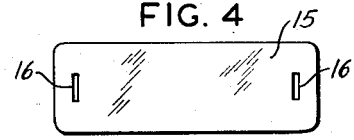
FIG. 4
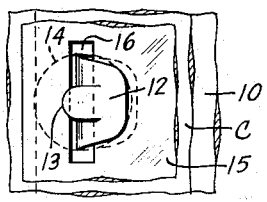
FIG. 5
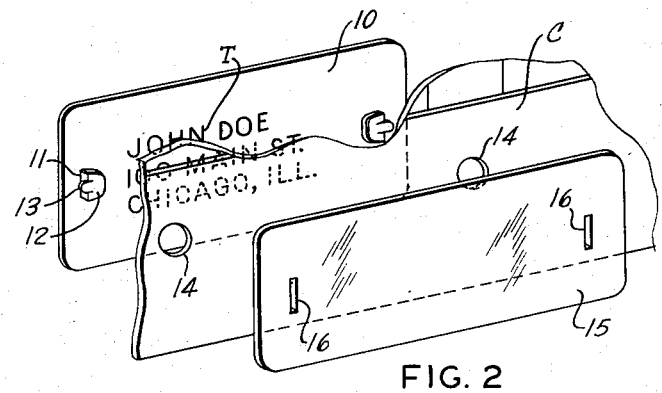
FIG. 2
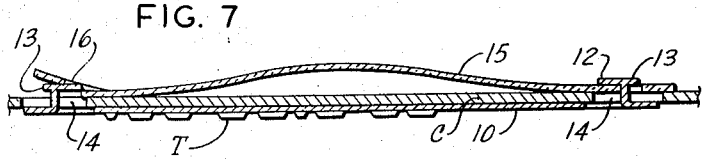
FIG. 7
FIG. 6
INVENTOR.
LYLE W. SEIFRIED
BY *Wallace and Cannon*
ATTORNEYS Patented Mar. 31, 1953

2,633,080

UNITED STATES PATENT OFFICE 2,633,080

ADDRESS TYPE PRINTING DEVICE

Lyle W. Seifried, Euclid, Ohio, assignor to Addressograph-Multigraph Corporation, Wilmington, Del., a corporation of Delaware Application March 3, 1951, Serial No. 213,790

4 Claims. (Cl. 101—369)

This invention relates to printing devices of the kind adapted for use with business instruments such as ledger cards and the like.

Many business institutions do business on the so-called time-payment plan, under which the customers of the business make payments periodically. It is customary in such instances to record the payments as they are made on the so-called ledger card, the entries being made on the card either manually or through the use of a suitable business machine such as a cash register. Usually cards of the aforesaid nature bear a designation indicative of the dates on which payments are due, and it is customary to go through the cards daily and to pick out those cards showing a payment to be past due. Cards so selected from the group are then used to prepare a notice with respect to the past due payment to notify the customer of this fact. Heretofore the name and address of the customer have usually been manually transcribed from the card onto a notice or the envelope to contain the same. It is inevitable in such manual transcription that errors accrue.

The foregoing is but one of the business practices in which my invention may be used. Thus, my invention may be successfully employed by loan companies, insurance companies, and others, where a record is maintained with particular reference to a name and address which needs to be transcribed from time to time. Moreover, the card or the like may be only slightly larger than the printing and retaining members and may bear identifying data related to the data that may be printed from the type characters on the printing member.

It is a primary object of my invention to secure a type bearing printing member to a card of the aforesaid nature or the like in such a manner that undesired displacement of the printing member from the card will be prevented.

The cards or the like with which my invention is embodied are usually filed side by side and in usage are slid one over the other. In such usage the edge of one card may pass between a printing member and the card in which it is mounted, and this may result in displacement of the printing member from the card on which it is mounted unless the printing member and the retention therefor are so arranged that relative movement between the printing member and its retention need be effected before one can be separated from the other, and to enable this to be realized in a novel manner is yet another object of this invention.

Further objects of this invention are to equip a printing member with clips under which marginal portions of a flexible retaining member may be disposed, and to provide lips in association with the clips in such a way that the retention member may be also fitted beneath the lips; to so relate a clip and lip arrangement of the aforesaid character to the retention member that flexing of the retaining member and forcible separation of the member from the lip will be necessary to bring about separation of the printing and the retention members; and to provide an arrangement of the aforesaid character that will be of simple and economical construction and which will be efficient and positive in use.

Other and further objects of the present invention will be apparent from the following description and claims and are illustrated in the accompanying drawing which, by way of illustration, shows a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawing:

Fig. 1 is an elevational view of a ledger card with which my invention has been incorporated;

Fig. 2 is an exploded view showing the relation among the printing member, the card and the retaining member;

Fig. 3 is a front elevational view of the printing member;

Fig. 4 is an elevational view of the retaining member;

Fig. 5 is a fragmentary elevational view, drawn to an enlarged scale, of the clip and lip arrangement of the present invention;

Fig. 6 is a sectional detail view taken substantially on the line 6—6 in Fig. 1; and Fig. 7 is a view similar to Fig. 6, but illustrating the manner in which separation of the retaining member from the printing member is effected.

In the accompanying drawing I have shown a ledger card C which is typical of wide variety of business instruments or the like with which my invention may be embodied and which constitutes a carrier.

My invention includes a printing member 10 formed of suitable ductile metal or the like on which type characters may be embossed to appear in relief on one face thereof and in intaglio on the opposite face. The printing member 10 is substantially rectangular in outline and on the face thereof where the type characters appear in intaglio and inwardly of each of the shorter edges thereof, and substantially medially in the extent of such edges, a retaining clip is formed by striking a portion of the body of the printing member therefrom to extend in normal relation with the body of the printing member as indicated at 11. The material at the free end of each portion 11 is bent inwardly and into parallel relation with the body of the printing member to thereby afford a retaining portion 12. A lip 13 is struck from the portion 11 and is disposed in the same plane as the retaining portion 12 but extends in a direction opposite to the retaining portion. An arrangement of this character is provided at each end of the printing member 10.

Openings as 14 are formed in the card C in the portion thereof whereat the printing member 10 is to be mounted, and these openings 14 are spaced one from the other and in an amount corresponding to the spacing of the retaining clips and lips provided at opposite ends of the printing member 10 so that the retaining clips and lips may freely pass through the openings as 14 whereby the printing member 10 may be disposed on one face of the card C, while the retaining portion 12 and the lip 13 will be disposed on the other face of the card C in spaced relation therewith so as to afford an area into which a retaining member may be fitted. The printing member 10 is related to the card in such a way that the face thereof on which the type characters appear in relief will be exposed so that printing impressions may be readily made from the type characters.

A retaining member 15 is provided and is substantially rectangular in outline and is formed from a flexible material such as cellulose acetate or the like. A slot as 16 is formed in the member 15 adjacent of each of the shorter marginal edges thereof and these slots 16 in the retaining member 15 are spaced apart one from the other in the same amount that the vertically extending portions 11 on the printing member 10 are spaced one from the other so that, as best shown in Fig. 6, when the elements of my novel arrangement are assembled, the vertically extending portions 11 will freely pass through the slots 16.

The retaining portion 12 and the lip 13 are so spaced from the adjacent face of the printing member 10 that the combined thickness of the card C and the retaining member 15 is substantially equal to the space afforded between the undersides of the portion 12 and lip 13 and the adjacent face of the card C. Hence the card C and member 15 neatly fit between the adjacent faces of the printing member 10, the retaining member 12 and lip 13.

Each slot 16 is much narrower than the combined horizontal extent of the retaining portion 12 and the lip 13 and each such slot is somewhat wider than the thickness of the portion 11 that is to be extended therethrough. Hence when the elements are assembled as shown in Fig. 6, the portion 12 and the lip 13 overlie marginal portions of the retaining member 15 disposed adjacent to opposite edges of a slot 16. Therefore, the retaining member 15 is firmly anchored beneath the retaining portion 12 and the lip 13, and the arrangement is such that accidental displacement of the printing member 10 from the card C is effectively prevented.

When the printing member 10 is to be removed from the card as C, the retaining member 15 is forced longitudinally in one direction and then what will be the forward end thereof, is pulled upwardly to be freed from beneath the lip 13. The intermediate portion of the member 15 is then flexed upwardly, as shown in Fig. 7, to thereby withdraw the marginal portion adjacent the slot 16 from beneath the retaining portion 12. This operation is then repeated for the opposite ends of the retaining and printing members, and when the retaining member 15 is disconnected from the printing member 10, then this printing member may be removed from the card C by moving the retaining portion 12 and lips 13 through the openings 14 in the card C.

It will be apparent from the foregoing description that if the cards bearing printing members in the manner just described are mounted in side-by-side relation, and if these cards are slid one over the other, the passage of the marginal portion of one card between the printing member and the card on which it is mounted, or between a retaining member on the card in which it is mounted, will not be effective to effect separation of the printing member from the card on which it is mounted for the reason that marginal portions of the retaining member 15 adjacent to the slot 16 will always remain beneath either the retaining portions 12 or the lips 13 or both. Hence, separation of the printing member from the card can only be effected by manipulation of the retaining member 15 in the manner described hereinabove.

It will be apparent from the foregoing that the illustrated arrangement enables the hereinabove set forth and kindred objects of this invention to be realized, and while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A printing device comprising a carrier having openings formed therein that are spaced apart in a predetermined distance, a substantially rectangular printing member mounted on one side of said carrier, a flexible retaining member substantially complementary in outline to said printing member and mounted on the other side of said carrier, said printing member having clips formed thereon substantially medially of the shorter edges thereof and inwardly of such edges and which are spaced apart so as to be respectively movable through the spaced apart openings in said carrier, each of said clips including a part extended in normal relation to the printing member that is extended through the openings in said carrier, retaining portions at the outer ends of said parts that are extended inwardly of and in spaced relation with said printing member, and a lip struck from a portion of each of said clips and disposed in the same plane as said retaining portion of the clip, each of said lips extending in a direction opposite to the adjacent retaining portion, said retaining member having slots formed therein substantially medially of the shorter edges thereof and inwardly of such edges and which are so spaced one from the other that the normally extending parts of the clips may be freely and respectively passed therethrough, the marginal portions of said retaining member adjacent to said slots being disposed between the carrier and the retaining portions and lips to thereby prevent movement of the clips and lips through the openings in said carrier whereby said printing member is securely retained on said carrier.

2. A printing device comprising a carrier having openings formed therein that are spaced apart in a predetermined distance, a substantially rectangular printing member mounted on one side of said carrier, a flexible retaining member substantially complementary in outline to said printing member and mounted on the other side of said carrier, said printing member having clips formed thereon substantially medially of the shorter edges thereof and inwardly of such edges and which are spaced apart so as to be respectively movable through the spaced apart openings in said carrier, each of said clips including parts extended in normal relation to the printing member and which extend through the openings in said carrier, retaining portions at the outer ends of said parts that are extended inwardly of and in spaced relation with said printing member, and a lip struck from a portion of each of said clips and disposed in the same plane as the retaining portion of the clip, each of said lips extending in a direction opposite to the adjacent retaining portion, said retaining member having slots formed therein substantially medially of the shorter edges thereof and inwardly of such edges and which are so spaced one from the other that the normally extending parts of the clips may be freely and respectively passed therethrough, the marginal portions of said retaining member adjacent to said slots being disposed between the carrier and the retaining portions and lips to thereby prevent movement of the clips and lips through the openings in said carrier whereby said printing member is securely retained on said carrier, said slots being wider than the thickness of the normally extending parts of said clips whereby the retaining member may be moved relative to said normally extending parts into a position whereat a marginal portion of the retaining member adjacent to one of said slots may be moved from beneath one of said lips, said retaining member being flexed substantially medially thereof to enable the other marginal portion thereof adjacent to said slot to be moved from beneath the retaining portion of the adjacent clip.

3. A printing device comprising a carrier having an opening formed therein, a printing member mounted on one side of said carrier, a flexible retaining member mounted on the other side of said carrier, said printing member having a clip formed thereon inwardly of one edge thereof and which is movable through the opening in said carrier, said clip including a part extended in normal relation to the printing member and which extends through the opening in said carrier, a retaining portion at the outer end of said part that extends inwardly of and in spaced relation with said printing member, and a lip struck from a portion of said clip and disposed in the same plane as said retaining portion and extending in a direction opposite to said retaining portion, said retaining member having a slot formed therein inwardly of one edge thereof and which is so sized as to enable the normally extending part to be freely passed therethrough, the marginal portions of said retaining member adjacent to said slot being disposed between the carrier and the retaining portion and lip to thereby prevent movement of the clip and lip through the opening in said carrier whereby said printing member is securely retained on said carrier.

4. As an article of commerce an embossable printing plate and a retaining member adapted for mounting on a flat carrier part that has openings formed therein that are spaced apart a predetermined distance, said plate and said retaining member being adapted to be disposed in face-to-face relation and being substantially rectangular and complementary in outline, said printing plate having clips formed thereon adjacent to opposite edges thereof, the clips including parts extended in normal relation to the plate with the parts being spaced apart the same predetermined distance as the openings in the carrier part and adapted to be extended through the openings, retaining portions at the outer ends of said parts that are extended inwardly of and in spaced relation with the printing plate, a lip struck from a portion of each of said clips and disposed in substantially the same plane as the retaining portion of the clip, each of said lips extending in a direction opposite to the adjacent retaining portion, the retaining member having slots formed therein adjacent to opposite edges thereof and which are spaced apart the same predetermined distance as the openings and through which the clips on the printing plate may be passed to have the retaining portions and lips respectively overlie portions of the retaining member adjacent to the slots formed therein whereby the plate and member may be interconnected one with the other.

LYLE W. SEIFRIED.

REFERENCES CITED

The following references are of record in the file of this patent:

UNITED STATES PATENTS

| Number | Name | Date |
| --- | --- | --- |
| Re. 20,344 | Van Dusen | Apr. 27, 1937 |
| 1,820,090 | Polkosnik | Aug. 25, 1931 |
| 1,831,363 | Mohler | Nov. 10, 1931 |
| 1,875,995 | Dickman | Sept. 6, 1932 |
| 1,929,472 | Berthelsen | Oct. 10, 1933 |
| 2,030,865 | Gollwitzer | Feb. 18, 1936 |
| 2,305,195 | Richter | Dec. 15, 1942 |
| 2,425,323 | Hueber | Aug. 12, 1947 |
| 2,518,535 | Farrington | Aug. 15, 1950 |

FOREIGN PATENTS

| Number | Country | Date |
| --- | --- | --- |
| 104,223 | Sweden | Apr. 14, 1942 |